United States Patent Office 3,310,471
Patented Mar. 21, 1967

3,310,471
PLACENTAL LACTOGENIC FACTOR PROCESS
Alan J. Parcells, Portage, Mich., assignor to The Upjohn Company, Kalamazoo, Mich., a corporation of Delaware
No Drawing. Filed May 13, 1965, Ser. No. 455,612
1 Claim. (Cl. 167—74)

This invention relates to methods of purifying a biologically active principle obtained from placenta, more particularly a process of purifying human placental lactogenic factor.

The occurrence and preparation of a human placental lactogenic factor or principle is known in the art as described by Higashi, Endocrinol. Jap. 8: 288, 1961; Higashi, Endocrinol. Jap., 9: 1, 1962; and Josimovich and MacLaren, Endocrinol., 71: 209, 1962.

Various important biological activities described for this human placental lactogen have resulted in the study of procedures for preparing material with physico-chemical homogeneity and advantageous specific potency. For example, Higashi, Endocrinol. Jap., 8: 288, 1961, has indicated that the human placental lactogen potentiates the protein anabolic effects of pituitary growth hormone. The same author, Endocrinol. Jap., 9: 1, 1962, suggests that the said factor acts in concert with human chorionic gonadotropin in the promotion and maintenance of the gestational function of the corpus luteum. A lactogenic effect of human placental lactogen has been described in the pseudopregnant rabbit, Chadwick, J. Endocrinol., 27: 253, 1963.

The process of the present invention now makes it possible to eliminate certain interfering and contaminating materials from human placental lactogen and to obtain a more satisfactory lactogenic factor which is physico-chemically purified and contains high specific potency by the complement fixation method of assay.

The starting material utilized in the present process can be obtained by methods known in the art, for example Josimovich and MacLaren, Endocrinol. 71: 209, 1962 and references described therein. The preferred method of preparing the starting material is to extract fresh whole placenta or a residue of placental pulp from the extraction of blood serum proteins with tris(hydroxymethyl) aminomethane-maleate buffer of pH 8.6, 0.08 M. This molarity is prepared from a stock buffer of this pH 0.8 M [(9.69 gm. of the tris(hydroxymethyl)aminomethane, 7.84 gm. of maleic anhydride, 4.4 gm. of sodium hydroxide with sufficient water to make one liter)]. That portion of the placenta tissue which is soluble in the buffer, 0.08 M, is adjusted to pH 6.5 to remove a precipitate, the supernatant being further adjusted to pH 4.5 to remove another precipitate. The pH 4.5 soluble material is then brought to 1.9 molarity with solid ammonium sulfate and centrifuged. The supernatant is discarded and the precipitate is redissolved and reprecipitated with the same molarity of ammonium sulfate. The thus-obtained precipitate is dialyzed to remove salt and upon lyophilization of the dialyzed material a one-half saturated ammonium sulfate precipitate of human placental lactogenic factor is obtained.

The present process utilizes column or batch chromatography on diethylaminoethyl cellulose, an anion exchanger prepared preferably from wood cellulose by treatment in sodium hydroxide solution with 2-chloro-triethylamine according to the technique of Peterson and Sober, J.A.C.S., 78: 751, Feb. 20, 1956. The placental lactogenic factor is applied to this cellulosic compound in the form of an aqueous solution having a pH of from about 8 to about 10. Such an aqueous solution can be prepared with a bicarbonate-carbonate buffer of 0.02 molarity prepared from 4.9 gm. of sodium carbonate, 3.5 gm. of sodium bicarbonate and q.s. purified water to 8 liters or from a pH 8.5 tris(hydroxymethyl)aminomethane-maleate buffer of 0.02 molarity. The aqueous solution is also used as a wash. As eluent the invention utilizes such aqueous buffer solutions containing molarities of sodium chloride over the range of about 0.1 molar to about 2.0 molar.

As aforesaid, the general method of purification utilizes either batch or column techniques. However, it is preferred to use the column technique and to flow through the column an aqueous solution of the human placental lactogenic factor, wash the column with more of the buffer used in preparing the aqueous solution, and proceed thereafter to elute the lactogen as aforesaid with varying molarities of sodium chloride. Fractions of eluent are collected, combined in accordance with peaks of optical density measurements at a wave length of 280 m$\mu$, dialyzed and converted to dry powders by lyophilization.

The following examples set forth how to perform the inventive process and the best mode contemplated of carrying out the invention but are not to be construed as limiting.

EXAMPLE 1

200 mg. of a one-half saturated ammonium sulfate precipitate from human placental lactogen was stirred with 15 ml. of the pH 10 bicarbonate-carbonate buffer, 0.02 ionic strength. After 30 minutes the whole was centrifuged and the insoluble portion was re-extracted with 8 ml. of the same buffer and re-centrifuged. The combined soluble portions were applied to a column of diethylaminoethyl ether of cellulose (volume 1.25 cm. x 50 cm.). Thereafter additional buffer was passed over the column at a flow rate of about 30 ml./hr. and 3 ml. fractions of eluate were collected in tubes. At tube 80 a linear gradient was initiated using 175 ml. of 0.02 ionic strength buffer in the mixing chamber and 175 ml. of 0.2 M NaCl, 0.02 ionic strength buffer as the limit developer. The gradient was complete at tube 179 and elution was continued using the 0.2 M NaCl buffer system up to tube 198. At this point a new gradient was initiated utilizing 100 ml. of 0.2 M sodium chloride buffer in the mixing chamber and 100 ml. of 2.0 M sodium chloride 0.02 ionic strength buffer as the limiting developer. At tube 249 the column was cleared with 0.1 normal sodium hydroxide.

Fractional eluates of 3 ml. each were combined, dialyzed and lyophilized as follows:

| Fraction | Tube No. | Dry Weight, mg. |
|---|---|---|
| 110.1 | 18–54 | 3.7 |
| 110.2 | 98–144 | 67.0 |
| 110.3 | 145–171 | 33.4 |
| 110.4 | 277–297 | 9.3 |

By the Ouchterlony plate technique, Arkiv. Kemi, B26, 1 (1949), fraction 110.3 was immunologically active at 100 and 500 $\gamma$/ml. The starting material was inactive below 500 $\gamma$/ml.

EXAMPLE 2

200 mg. of one-half saturated ammonium sulfate product was extracted with 20 ml. of tris-maleate buffer, 0.02 M of pH 8.6. The insoluble residue was removed at the centrifuge and the supernatant, an aqueous solution of human placental lactogen, was applied to a diethylaminoethyl cellulose column previously equilibrated with the same buffer. The column was 50 cm. long and 1.25 cm. in diameter. Initial washing was carried out with this same buffer and 3 ml. fractional eluates were collected in test tubes at a flow rate of 20 ml./hr. At tube 31 a stepwise gradient was initiated using 0.1 M sodium chloride in the 0.02 molar buffer. At tube 75, 1.0 M sodium chloride in the buffer was used. The column was stripped at tube 128 with 0.1 N sodium hydroxide.

The fractionally collected eluates were combined, dialyzed and the dialyzed material was recovered by lyophilization as follows:

| Fraction | Tube No. | Dry Weight, mg. |
|---|---|---|
| 104.1 | 44–80 | 12.2 |
| 104.2 | 93–110 | 28.4 |
| 104.3 | 164–completion | 4.4 |

Quantitative complement fixation assays were performed by a modification of the method for parathyroid hormone of Tashjian et al., Endocrinology 74, 244, 1964. Purified human growth hormone with Freund's adjuvant was injected into rabbit foot pads. Seven to 10 days later the growth hormone was injected subcutaneously and 3 weeks later intravenously. Anti-serum to the growth hormone was collected 7 days later. A 1 to 50 dilution of the anti-serum in pH 7.4 aqueous buffer was used for the complement fixation assays. Standards of both human growth hormone and human placental lactogen are used in the assay of the unknown.

*Mcg. required to inhibit 50% of complement-fixation by anti-human growth hormone*

| | |
|---|---|
| 104.1 | 50 |
| 104.2 | 0.39 to 0.78 |

EXAMPLE 3

1 gm. of one-half saturated ammonium sulfate placental lactogenic factor was processed as in Example 2 except that recovery from the active eluate was carried out by precipitation with q.s. ammonium sulfate to ½ saturation, centrifugation, dialysis and lyophilization. The yield of purified material was 41.4 mg. requiring 0.025 mcg. to inhibit 50% of complement-fixation by anti-human growth hormone.

What is claimed is:

The method of purifying human placental lactogenic factor which comprises applying to diethylaminoethyl cellulose an aqueous solution of human placental lactogen of pH about 8 to 10, washing with an aqueous buffer of this pH range, having an ionic strength of about 0.02, and removing the human placental lactogen from the diethylaminoethyl cellulose with an aqueous buffer having a sodium chloride molarity of about 0.1 to 2.0 and a pH of about 8 to 10.

No references cited.

ALBERT T. MEYERS, *Primary Examiner.*

LEROY B. RANDALL, *Assistant Examiner.*